US006753285B1

(12) United States Patent
Vaarkamp

(10) Patent No.: US 6,753,285 B1
(45) Date of Patent: Jun. 22, 2004

(54) PROCESS FOR REGENERATING A USED PRECIOUS METAL CATALYST

(75) Inventor: Marius Vaarkamp, Utrecht (NL)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/720,068

(22) PCT Filed: Jun. 24, 1999

(86) PCT No.: PCT/NL99/00389

§ 371 (c)(1), (2), (4) Date: Mar. 8, 2001

(87) PCT Pub. No.: WO99/67023

PCT Pub. Date: Dec. 29, 1999

(30) Foreign Application Priority Data

Jun. 25, 1998 (EP) .......................................... 98202127

(51) Int. Cl.[7] .......................... B01J 38/60; B01J 20/34; B01J 38/10

(52) U.S. Cl. ............................. 502/27; 502/28; 502/53

(58) Field of Search .............................. 502/27, 28, 53

(56) References Cited

U.S. PATENT DOCUMENTS

| | | | | | |
|---|---|---|---|---|---|
| 3,804,777 | A | | 4/1974 | Canavesi et al. | 252/413 |
| 3,879,311 | A | | 4/1975 | Schott et al. | 252/415 |
| 4,092,267 | A | * | 5/1978 | Fernholz et al. | 252/413 |
| 4,330,429 | A | * | 5/1982 | Sasaki et al. | 502/26 |
| 4,359,400 | A | * | 11/1982 | Landolt et al. | 502/53 |
| 4,485,183 | A | * | 11/1984 | Miller et al. | 502/25 |
| 5,068,477 | A | * | 11/1991 | Berrebi | 585/274 |
| 5,391,527 | A | * | 2/1995 | Kojima et al. | 502/53 |
| 5,695,634 | A | * | 12/1997 | Neuenfeldt et al. | 210/757 |

FOREIGN PATENT DOCUMENTS

| | | |
|---|---|---|
| CH | 486 498 | 2/1970 |
| EP | 0 778085 | 6/1997 |
| FR | 2 325 289 | 4/1977 |

* cited by examiner

*Primary Examiner*—Stanley S. Silverman
*Assistant Examiner*—Jonas N. Strickland
(74) *Attorney, Agent, or Firm*—Weingarten, Schurgin, Gagnebin & Lebovici LLP

(57) ABSTRACT

The invention is directed to a process for the regeneration of a catalyst, said catalyst comprising at least one precious metal on an amorphous silica-alumina support, in which process the catalyst is impregnated with an acid, followed by reduction or oxidation of the impregnated catalyst at a temperature above 200° C.

35 Claims, No Drawings

PROCESS FOR REGENERATING A USED PRECIOUS METAL CATALYST

The present invention is directed to a process for regenerating a used precious metal catalyst by redispersing the precious metal. Regeneration of used precious metal catalysts is an important aspect of this type of catalyst technology, intended to extend the lifetime of the precious metal catalyst. Regeneration is generally performed in three steps, namely 1) Removal of carbonaceous deposits (usually by burning), 2) redispersion of the precious metal, and 3) reduction of the redispersed precious metal.

Various methods for regeneration of used precious metal catalyst by redispersion of the precious metal on the support are known. Generally the redispersion is done by treatment with oxygen, $Cl_2$ or $Br_2$.

In a review article of J. B. Butt and E. E. Petersen in Activation, Deactivation and Poisoning of Catalyst, Academic Press (1988), pp 214 to 232, it has been indicated that the following general types of redispersion procedures have been suggested: 1) thermal treatment in an oxygen atmosphere, 2) thermal treatment in oxygen followed by reduction in hydrogen, 3) high temperature treatment followed by rapid cooling or 4) chemical dissolution of contaminants and redispersion of the metal. In this article it has been indicated that the behaviour of a catalyst in redispersion experiments is very much dependent on the nature of the support. A platinum on alumina catalyst can for example be redispersed using air, whereas platinum on silica behaves totally different.

In WO-A 95/23643 a process has been described for the catalytic treatment of waste water, using a precious metal catalyst, which process includes as part of the overall process the regenerating of the catalyst. The regeneration of he catalyst which is a palladium on silica/carbon, is done by washing with an organic solvent, and/or acid and/or by thermal treatment.

In U.S. Pat. No. 3,804,777 a process has been described, wherein lead contaminants present in a precious metal catalyst are dissolved by percolating a dilute acid at ambient temperature through the catalyst, followed by treatment with hydrogen at about 100° C.

The present invention deals with a process for regenerating a precious metal catalyst on an amorphous silica alumina support. The inventors of the present invention have found that the conventional methods, for example such as reported by Butt et al, but also the methods using chlorine or bromine do not result in an increase of dispersion, as will be shown in the examples to be reported herein. Various known methods result in a decrease of the degree of dispersion.

It is an object of the present invention to provide a method for redispersing the precious metal present in a catalyst based on an amorphous silica-alumina support.

The process according to the present invention for the regeneration of a catalyst, said catalyst comprising at least one precious metal on an amorphous silica alumina support, comprises impregnating the catalyst with an acid, followed by reduction or oxidation of the impregnated catalyst at a temperature above 200° C.

The regeneration of the catalyst, as used herein, indicates a redispersion of the said at least one precious metal over the surface of the support.

Surprisingly it has been found that the use of an acid in a liquid state, such as an aqueous solution, followed by the specific thermal treatment results in a redispersion of the precious metal on the support, whereas other methods result in a decrease of the degree of dispersion.

Suitable precious metals for use in the catalyst to be regenerated by the process according to the present invention are platinum, palladium, gold, iridium, rhenium, ruthenium, rhodium, osmium and silver. Also combinations of two or more of those precious metals can be used. So it is possible to use a combination of at least one of those precious metals with one or more other metals. The preferred catalyst to be regenerated by the process of the present invention is based on platinum and/or palladium.

The precious metal catalysts to be regenerated by the process of the present invention have generally been used for reactions involving hydrogenation, such as hydrogenation itself, hydro-isomerisation, hydro-desulfurisation and hydro-dewaxing. The may also have been used in dehydrogenation reactions, such as catalytic reforming. Once the performance, of the catalyst decreases below a certain level the catalyst is regenerated. In some processes it is also usual to perform regeneration simply after a certain amount of time has passed, without waiting for a decrease of the activity.

The catalyst to be regenerated is, either in the reactor or in a separate plant, prepared for the actual redispersion experiment. This step includes the removal, of carbonaceous deposits and other unwanted material on the catalyst. This can for example be done by washing using a suitable solvent and/or by burning of the contaminants.

Subsequently the catalyst is impregnated with an acid, preferably in an aqueous solution. Suitable acids are the usual mineral acids, including HCl, $H_3PO_4$, $H_2SO_4$, $HNO_3$, HBr, or combinations of two or more of these acids. The amount of acid on the basis of the ratio of equivalents of acid to atoms of precious metal is between 0.1 and 100, preferably between 0.5 and 10. After impregnating the catalyst with the acid, the impregnated catalyst is either reduced in a flow of hydrogen gas or oxidised in a flow of dry air, followed by reduction. In a more preferred embodiment both reduction and oxidation are carried out at a temperature of at least 250° C. and more in particular between 250° C. and 600° C.

After the final reduction step a supported catalyst is obtained usually having approximately the same degree of dispersion as the original catalyst. Sometimes the treatment even results in an increase of degree of dispersion. It is to be noted in this respect that the degree of dispersion is related to the precious metal crystallite size. The degree of dispersion can for example be determined by CO-chemisorption, whereby the amount of CO absorbed by the precious metal gives an indication of the number of metal atoms available on the surface of the metal crystallites. A larger amount of chemisorbed CO indicates a higher degree of dispersion, i.e. a smaller metal crystallite size.

An important aspect of the present invention resides therein that the catalyst to be regenerated is based on an amorphous silica alumina support. On the support a precious metal is present preferably in an amount of from 0.001 to 5 wt. %, calculated on the weight of the catalyst (in reduced form). The amorphous silica-alumina support is preferably prepared using a sol-gel method, whereas the support has an Si/Al atomic ratio of between 0.1 and 300. As has been indicated before, the type of support is extremely important in the selection of the regeneration method.

The present invention is now elucidated on the basis of a number of experiments.

EXAMPLES

In the examples the effect of various treatments on the dispersion of 0.7 wt. % platinum on a silica-alumina support having an Si/Al atomic ratio of 8 is shown. The catalyst support is prepared by a sol-gel method as for example described in International patent application PCT/NL98/00090. The fresh catalyst had an CO/Pt ratio of 0.25, which is a measure for the degree of dispersion of the precious metal.

Samples of this catalyst were subjected to various treatments, which are described in the subsequent table, together with the result thereof.

TABLE 1

Redispersion experiments for Pt/silica-alumina

| treatment | CO/Pt |
| --- | --- |
| none | 0.25 |
| air 400° C. | 0.25 |
| air 500° C. | 0.23 |
| 500° C., 0.8% Cl, 5% H2O, 2 h | 0.12 |
| 530° C., 0.8% Cl, 5% H2O, 4 h | 0.07 |
| 530° C., 0.8% Cl, 5% H2O, 2 h | 0.07 |
| HCl imp, dry air 400° C. | 0.31 |
| HCl imp, H2 300° C. | 0.33 |
| HCl imp, wet air 400° C. | 0.07 |
| HCl imp, wet HCl 200° C. | 0.12 |

As can be seen from this table, treatment with air had almost no influence, whereas treatment with a gas flow containing chlorine and water strongly decreased the dispersion. Also impregnating with hydrochloric acid, followed by wet air or wet hydrochloride at increased temperature resulted in a strong decrease of degree of dispersion. Only acid impregnation followed by treatment with dry air and hydrogenation, or acid impregnation followed by hydrogenation only, showed an improvement in the degree of dispersion.

What is claimed is:

1. Process for the regeneration of a catalyst, said catalyst comprising at least one precious metal on an amorphous silica-alumina support, in which process the catalyst is impregnated with an acid in liquid state, followed by reduction or oxidation of the impregnated catalyst at a temperature above 200° C.

2. Process according to claim 1, wherein the precious metal is selected from the group consisting of Pt, Pd, Au, Ir, Ru, Rh, Re, Os and Ag, preferably Pt and/or palladium.

3. Process according to claim 2, wherein:

the degree of dispersion is increased after the regeneration;

the acid impregnated catalyst is reduced in a flow of hydrogen gas;

the acid impregnated catalyst is oxidised in a flow of dry (<0.1 vol. % of water) air, followed by reduction;

the reduction and or oxidising step are carried out at a temperature of between 250 and 600° C.;

the silica-alumina support has been prepared using a sol-gel method;

the support has Si—Al atomic ratio of from 0.1 to 300;

the catalyst has a precious metal content of from 0.01 to 5 wt. %, calculated on the basis of the weight of reduced catalyst;

the catalyst is impregnated with an aqueous solution of the acid;

the acid is selected from the group consisting of HCl, $H_3PO_4$, $H_2SO_4$ $HNO_3$, HBr and combinations thereof;

the amount of acid calculated on the basis of a ratio of equivalents of acid to atoms of precious metal is between 0.1 and 100;

prior to the impregnation, carbonaceous deposits on the catalyst are burned off;

the regeneration is carried out in a reactor, separate from the reactor in which the catalyst is used; and the catalyst is a used catalyst from a process selected from the group consisting of hydrogenation, hydro-isomerisation, hydro-desulfurisation, hydrowaxing and catalytic reforming.

4. Process for hydrogenation, hydro-isomerisation, hydro-desulferisation or hydrodewaxing, comprising treating the feedstock in the presence of a catalyst that has been regenerated using the process of claim 3.

5. Process according to claim 3, wherein the amount of calculated on the basis of a ratio equivalents of acid to atoms of precious metal is between 0.5 and 10.

6. Process according to claim 1, wherein the degree of dispersion is increased after the regeneration.

7. Process according to claim 1, wherein the acid impregnated catalyst is reduced in a flow of hydrogen gas.

8. Process according to claim 1, wherein the acid impregnated catalyst is oxidised in a flow of dry (<0.1 vol. % of water) air, followed by reduction.

9. Process according to claim 1, wherein the reduction and/or oxidizing step are carried out at a temperature of between 250 and 600° C.

10. Process according to claim 1, wherein the silica-alumina support has been prepared using a sol-gel method.

11. Process according to claim 1, wherein the support has an Si—Al atomic ratio of from 0.1 to 300.

12. Process according to claim 1, wherein the catalyst has a precious metal content of from 0.01 to 5 wt. %, calculated on the basis of the weight of reduced catalyst.

13. Process according to claim 1, wherein the catalyst a impregnated with and aqueous solution of the acid.

14. Process according to claim 1, wherein the acid is selected from the group consisting of HCl, $H_3PO_4$, $H_2SO_4$, $HNO_3$, HBr and combinations thereof.

15. Process according to claim 1, wherein the amount of acid calculated on the basis of a ratio equivalents of acid to atoms of precious meal is between 0.1 and 100.

16. Process according to claim 1, wherein prior to the impregnation, carbonaceous deposits on the catalyst are burned off.

17. Process according to claim 1, wherein the regeneration is carried out in a reactor, separate from the reactor in which the catalyst is used.

18. Process according to claim 1, wherein the catalyst is used catalyst from a process selected from the group consisting of hydrogenation, hydro-isomerisation, hydro-desulfurisation, hydrodewaxing and catalytic reforming.

19. Process for hydrogenation, hydro-isomerisation, hydro-desulfurisation or hydrodewaxing, comprising treating the feedstock in the presence of a catalyst that has been regenerated using the process of claim 1.

20. Process according to claim 1, wherein the amount of acid calculated on the basis of a ratio equivalents of acid to atoms of precious metal is between 0.5 and 10.

21. Process for the regeneration of a catalyst, said catalyst comprising at least one precious metal on an amorphous silica-alumina support, in which process the catalyst is impregnated with an acid in liquid state, followed by reduction or oxidation of the impregnated catalyst at a temperature above 200° C., wherein the catalyst is used catalyst from a process selected from the group consisting of hydrogenation, hydro-isomerisation, hydrodesulfurisation, hydrodewaxing and catalytic reforming.

22. Process according to claim 21, wherein the precious metal is selected from the group consisting of Pt, Pd, Au, Ir, Ru, Rh, Re, Os and Ag, preferably Pt and/or palladium.

23. Process according to claim 21, wherein the degree of dispersion is increased after the regeneration.

24. Process according to claim 21, wherein the acid impregnated catalyst is reduced in a flow of hydrogen gas.

25. Process according to claim 21, wherein the acid impregnated catalyst is oxidised in a flow of dry (<0.1 vol. % of water) air, followed by reduction.

26. Process according to claim 21, wherein the reduction and/or oxidizing step are carried out at a temperature of between 250 and 600° C.

27. Process according to claim 21, wherein the silica-alumina support has been prepared using a sol-gel method.

28. Process according to claim 21, wherein the support has an Si—Al atomic ratio of from 0.1 to 300.

29. Process according to claim 21, wherein the catalyst has a precious metal content of from 0.01 to 5 wt. %, calculated on the basis of the weight of reduced catalyst.

30. Process according to claim 21, wherein the catalyst is impregnated with and aqueous solution of the acid.

31. Process according to claim 21, wherein the acid is selected from the group consisting of HCl, $H_3PO_4$, $H_2SO_4$, $HNO_3$, HBr and combinations thereof.

32. Process according to claim 21, wherein the amount of acid calculated on the basis of a ratio equivalents of acid to atoms of precious meal is between 0.1 an 100.

33. Process according to claim 21, wherein the amount of acid calculated on the basis of a ratio equivalents of acid to atoms of precious metal is between 0.5 and 10.

34. Process according to claim 21, wherein prior to the impregnation, carbonaceous deposits on the catalyst are burned off.

35. Process according to claim 21, wherein the regeneration is carried out in a reactor, separate from the reactor in which the catalyst is used.

* * * * *

UNITED STATES PATENT AND TRADEMARK OFFICE

CERTIFICATE OF CORRECTION

PATENT NO. : 6,753,285 B1
DATED : June 22, 2004
INVENTOR(S) : Marius Vaarkamp

It is certified that error appears in the above-identified patent and that said Letters Patent is hereby corrected as shown below:

Title page,
Item [30], Foreign Application Priority Data, "9820217" should read -- 98202127.1 --;

Column 1,
Line 35, "he" should read -- the --;

Column 3,
Line 58, "has Si-Al" should read -- has an Si-Al --;

Column 4,
Line 7, "hydrowaxing" should read -- hydrodewaxing --;
Line 10, "desulferisation" should read -- desulfurisation --; and
Line 33, "a" should read -- is --.

Signed and Sealed this

Twenty-fourth Day of May, 2005

JON W. DUDAS
*Director of the United States Patent and Trademark Office*